C. E. ROBERTSON.
SPIGOT.
APPLICATION FILED APR. 19, 1915.
1,190,586.
Patented July 11, 1916.
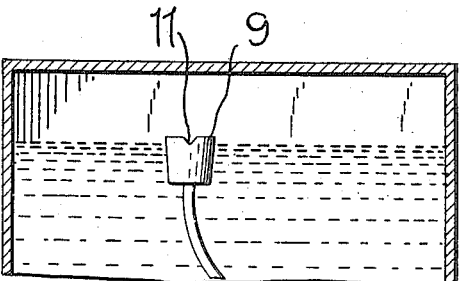
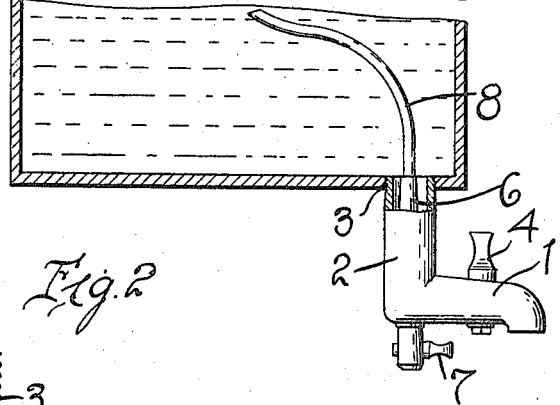
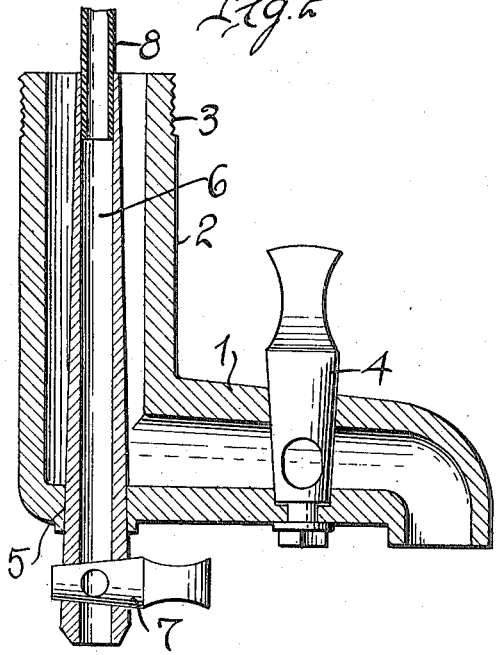
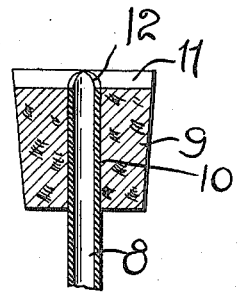
Inventor
C. E. ROBERTSON
By Watson E. Coleman
Attorney

UNITED STATES PATENT OFFICE.

CHARLES E. ROBERTSON, OF SHALE, CALIFORNIA.

SPIGOT.

1,190,586.　　　　Specification of Letters Patent.　　Patented July 11, 1916.

Application filed April 19, 1915.　Serial No. 22,437.

*To all whom it may concern:*

Be it known that I, CHARLES E. ROBERTSON, a citizen of the United States, residing at Shale, in the county of Kern and State of California, have invented certain new and useful Improvements in Spigots, of which the following is a specification, reference being had to the accompanying drawings.

This invention has for its primary object a simple, durable and efficient construction of device for use in drawing any kind of fluid from barrels, tanks, drums, or the like, and simultaneously admitting air into the receptacle, and the invention consists in certain constructions, arrangements and combinations of the parts that I shall hereinafter fully describe and claim.

For a full understanding of the invention, reference is to be had to the following description and accompanying drawing, in which, Figure 1 is a sectional view of a receptacle having my improved spigot and its correlated devices applied thereto, a portion of the spigot being shown in section. Fig. 2 is an enlarged vertical longitudinal sectional view of the device. Fig. 3 is a detail sectional view of the float and the attached portion of the flexible pipe hereinafter referred to.

Corresponding and like parts are referred to in the following description and designated in all of the views of the accompanying drawing by like reference characters.

Referring to the drawing, the numeral 1 designates a spigot or faucet which may be constructed of wood, metal or any other substance or material, as desired, and which is provided with a shank 2 that may be threaded, as at 3, for connection to the barrel or other receptacle, and with a turn plug or valve 4.

The spigot 1 is formed, in registry or connection with the interior of the tubular shank 2 with an opening 5 in which a tube 6 is adapted to fit, said tube being in the present embodiment of the invention, shown as tapered from one end to the other with one end protruding out of the opening 5 and the remaining portion mounted within the tank 2, the tube being held by wedging or frictional action in its operative position, although it is to be understood that screw threads or the like may be used to connect these parts together. In the protruding or inlet end of the tube 6, exterior of the spigot proper, there is a turn plug or valve 7 to open or close the tube.

A flexible pipe 8 is connected at one end to the upper or inner end of the tube 6 in any desired way, said tube being formed of a section of rubber hose, and to the upper end of the pipe 8 a float 9 which, in the present instance, is formed of cork, is connected, said float, in the present embodiment of the invention, being formed with an opening 10 in which the upper end of the pipe is received and in which it is held by frictional engagement or otherwise, as desired.

From the foregoing description, in connection with the accompanying drawing, the operation of my invention will be apparent. When the device is applied to a barrel, drum, tank or other receptacle, and it is desired to draw the fluid therefrom, it is only necessary to open the valve 4 and the valve 7 whereupon the fluid will flow out through the spigot or faucet while at the same time air will be admitted into the interior of the receptacle through the air inlet tube 6, and its flexible pipe 8, the float resting on the upper surface of the contents of the receptacle and thus holding the outlet or discharge end of the air pipe 8 above said surface so as to allow the air to flow freely into the receptacle and prevent the fluid from flowing out through the air connections.

It will thus be seen that I have provided a very simple, durable and efficient construction of device which will readily admit air in the receptacle as the fluid is drawn therefrom.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined in the appended claim.

The cork float 9 is formed in its top with a diametrically disposed groove 11 registering with a corresponding groove 12 formed in the upper end of the pipe 8 whereby should the receptacle to which the device is applied be so full that the float would contact with the top thereof, still the grooves 11 and 12 would provide a duct for the passage of the air from the receptacle, immediately after any portion of the contents of the receptacle was drawn off, and even though, with a full receptacle, a portion of the fluid might pass downwardly through the pipe 8, yet that would do no harm at all, because the inlet opening in said pipe through the inlet tube 6 is located in close juxtaposition to the outlet opening of the spigot or faucet, and the fluid would thus be caught by the vessel disposed underneath the latter.

What is claimed, is:

A device of the character described, comprising a spigot, an air tube mounted therein and opening exteriorly thereof, a section of rubber hose connected at one end to the inner end of said tube and provided at its other end with a transverse groove, and a cork having an opening extending therethrough whereby it may be readily slipped upon the grooved end of said hose, the cork being further formed in its upper edge with a diametrical groove extending from side to side thereof and intersecting said opening.

In testimony whereof I hereunto affix my signature in the presence of two witnesses.

CHARLES E. ROBERTSON.

Witnesses:
 HOMER WEST,
 W. J. HOLLAND.

Copies of this patent may be obtained for five cents each, by addressing the "Commissioner of Patents, Washington, D. C."